(12) United States Patent
Drasny et al.

(10) Patent No.: US 9,536,024 B2
(45) Date of Patent: *Jan. 3, 2017

(54) METHODS FOR STATIC CHECKING OF ASYNCHRONOUS CLOCK DOMAIN CROSSINGS

(71) Applicant: International Business Machines Corporation, Armonk, NY (US)

(72) Inventors: Gabor Drasny, Poughkeepsie, NY (US); Gavin B. Meil, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/734,877

(22) Filed: Jun. 9, 2015

(65) Prior Publication Data

US 2015/0269296 A1 Sep. 24, 2015

Related U.S. Application Data

(63) Continuation of application No. 14/560,599, filed on Dec. 4, 2014.

(60) Provisional application No. 61/912,345, filed on Dec. 5, 2013.

(51) Int. Cl.
*G06F 17/50* (2006.01)

(52) U.S. Cl.
CPC ....... *G06F 17/5022* (2013.01); *G06F 17/5031* (2013.01); *G06F 17/5045* (2013.01); *G06F 17/5059* (2013.01); *G06F 2217/06* (2013.01); *G06F 2217/62* (2013.01); *G06F 2217/84* (2013.01)

(58) Field of Classification Search
CPC .................... G06F 17/5031; G06F 17/5045
USPC .......................................... 716/108
See application file for complete search history.

(56) References Cited

U.S. PATENT DOCUMENTS

| | | |
|---|---|---|
| 5,210,700 A | 5/1993 | Tom |
| 5,452,239 A | 9/1995 | Dai et al. |
| 5,835,380 A | 11/1998 | Roethig |
| 5,862,149 A | 1/1999 | Carpenter et al. |
| 6,175,946 B1 | 1/2001 | Ly et al. |
| 6,952,825 B1 | 10/2005 | Cockx et al. |
| 7,073,146 B2 | 7/2006 | Sarwary et al. |
| 7,080,365 B2 | 7/2006 | Broughton et al. |
| 7,089,518 B2 | 8/2006 | Bair et al. |
| 7,107,557 B2 | 9/2006 | Iwanishi |

(Continued)

OTHER PUBLICATIONS

"U.S. Appl. No. 14/274,956 Ex Parte Quayle Action", Apr. 10, 2015, 6 pages.

(Continued)

*Primary Examiner* — Stacy Whitmore
(74) *Attorney, Agent, or Firm* — DeLizio Law, PLLC

(57) ABSTRACT

A circuit design checker receives a circuit design. The circuit design can include a first set of one or more logic components in a first clock domain and a second set of one or more logic components in a second clock domain. The clock domain checker identifies a first subset of the second set of one or more logic components that receive one or more asynchronous clock domain crossings. The circuit design is traversed to determine whether a subset of the one or more asynchronous clock domain crossings does not pass through a signal having an attribute indicating that the signal is intended to be part of the one or more asynchronous clock domain crossings. If such a crossing exists, an error is indicated for the circuit design.

7 Claims, 11 Drawing Sheets

(56) References Cited

U.S. PATENT DOCUMENTS

| | | | |
|---|---|---|---|
| 7,124,342 | B2 | 10/2006 | Wang et al. |
| 7,139,988 | B2 | 11/2006 | Chard et al. |
| 7,243,322 | B1 | 7/2007 | Ly et al. |
| 7,251,794 | B2 | 7/2007 | Blanco et al. |
| 7,283,944 | B2 | 10/2007 | Tsai et al. |
| 7,299,436 | B2 | 11/2007 | Chu et al. |
| 7,333,926 | B2 | 2/2008 | Schuppe |
| 7,356,789 | B2 | 4/2008 | Ly et al. |
| 7,454,728 | B2 | 11/2008 | Ly et al. |
| 7,478,346 | B2 | 1/2009 | Hsu et al. |
| 7,484,192 | B2 | 1/2009 | Ja et al. |
| 7,484,196 | B2 | 1/2009 | Ja et al. |
| 7,562,244 | B2 | 7/2009 | Wielage |
| 7,594,200 | B2 | 9/2009 | Eisner et al. |
| 7,627,844 | B2 | 12/2009 | Rahmat et al. |
| 7,877,717 | B2 | 1/2011 | Chu et al. |
| 7,882,473 | B2 | 2/2011 | Baumgartner et al. |
| 7,979,820 | B1 | 7/2011 | Patzer et al. |
| 8,069,024 | B1 | 11/2011 | Croix |
| 8,271,918 | B2 | 9/2012 | Kwok et al. |
| 8,352,235 | B1 | 1/2013 | Lin et al. |
| 8,407,636 | B2 | 3/2013 | Iwashita |
| 8,434,047 | B1 | 4/2013 | Jiang et al. |
| 8,438,516 | B2 | 5/2013 | Ly et al. |
| 8,438,517 | B2 | 5/2013 | Appleton et al. |
| 8,448,111 | B2 | 5/2013 | Mneimneh et al. |
| 8,533,541 | B2 | 9/2013 | Iwashita |
| 8,914,761 | B2 | 12/2014 | Ly et al. |
| 2002/0152060 | A1 | 10/2002 | Tseng |
| 2003/0192018 | A1 | 10/2003 | Baumgartner et al. |
| 2004/0060024 | A1 | 3/2004 | Bednar et al. |
| 2007/0174805 | A1 | 7/2007 | Hsu et al. |
| 2008/0072188 | A1 | 3/2008 | Ja et al. |
| 2009/0055668 | A1 | 2/2009 | Fernsler et al. |
| 2009/0106183 | A1 | 4/2009 | Estan et al. |
| 2009/0112555 | A1 | 4/2009 | Boerstler et al. |
| 2009/0271167 | A1 | 10/2009 | Zhu et al. |
| 2011/0291769 | A1 | 12/2011 | Burstein et al. |
| 2013/0132760 | A1 | 5/2013 | Talupuru et al. |
| 2013/0246985 | A1 | 9/2013 | Ly et al. |

OTHER PUBLICATIONS

"U.S. Appl. No. 14/327,658 Office Action", Apr. 3, 2015, 9 pages.
Chakrabarty, et al., "Synthesis of Transparent Circuits for Hierarchical and System-On-A-Chip Test", National Science Foundation under grant No. CCR-9875324. pp. 1-6., 2001, 6 pages.
Cummings, "Clock Domain Crossing (CDC) Design & Verification Techniques Using SystemVerilog", SNUG-2008, 2008, 56 pages.
Foulon, "CAS Flow for System on Chip", The 13th International Conference on Microelectronics Rabat, Morocco, pp. 241-244, Oct. 29-31, 2001, Oct. 2001, 4 pages.
Hari, et al., "Automatic Constraint Based Test Generation for Behavioral HDL Models", IEEE Transactions on Very Large Scale Integration (VLSI) Systems, vol. 16, No. 4, pp. 408-421, Apr. 2008, 14 pages.
Litterick, "Pragmatic Simulation-Based Verification of Clock Domain Crossing Signals and Jitter using SystemVerilog Assertions", Verilab & DVCon ; https://www.verilab.com/files/sva_cdc_presentation_dvcon2006.pdf, 2006, 6 pages.
Narain, et al., "Clock Domain Crossing Demystified: The Second Generation Solution for CDC Verification", (Real Intent and Sunburst Design white paper), Mar. 13, 2008., 2008, 20 pages.
Ravi, et al., "TAO: Regular Expression-Based Register-Transfer Level Testability Analysis and Optimization", IEEE Transactions on Very Large Scale Integration (VLSI) Systems, vol. 9, No. 6, pp. 824-832, Dec. 2001, 9 pages.
Schubert, et al., "Solutions to IBM POWER8 Verification Challenges", IBM J. Res. & Dev., vol. 59, No. 1, Paper 11, Jan. 2015, pp. 11:1-11:17.
Seshadri, et al., "An Integrated Approach to Behavioral-Level Design-For-Testability Using Value-Range and Variable Testability Techniques", International Test Conference, 1999. pp. 858-867., 1999, 10 pages.
Singh, et al., "Generalized Latency-Insensitive Systems for Single-Clock and Multi-Clock Architectures", Design, Automation and Test in Europe Conference and Exhibition, 2004. Proceedings (vol. 2 ), Feb. 2004, pp. 1008-1013.
Srinivas, et al., "Formal Verification of Digital Circuits Using Hybrid Simulation", IEEE Circuits and Devices Magazine, pp. 19-27, Jan. 1988, 9 pages.
Suhaib, "Formal Methods for Intellectual Property Composition Across Synchronization Domains", Dissertation submitted to the Faculty of the Virginia Polytechnic Institute and State University, Aug. 29, 2007, 190 pages.
U.S. Appl. No. 11/547,532 FAI—OfficeAction Summary, Jun. 9, 2016, 9 pages.
U.S. Appl. No. 14/547,532 FAIIP PreInterview Communication, Mar. 22, 2016, 7 Pages.
U.S. Appl. No. 14/547,820 FAIIP—OA Summary, May 10, 2016, 10 pages.
U.S. Appl. No. 14/547,953 FAIIP—OA Summary, May 10, 2016, 12 pages.
U.S. Appl. No. 14/560,599 FAIIP PreInterview Communication, Apr. 13, 2016, 3 pages.

| COMPONENT | SYMBOL | OUTPUT BEHAVIOR AT TIME T | COMMENTS |
|---|---|---|---|
| BUFFER | | $Y(T)=A(T)$ | |
| INVERTER | | $Y(T)=NOT(A(T))$ | |
| 2-WAY AND 120 | | $Y(T)=$ $AND(A(T), B(T))$ | |
| 2-WAY OR | | $Y(T)=$ $OR(A(T), B(T))$ | |
| 2-WAY XOR | | $Y(T)=$ $XOR(A(T), B(T))$ | HAVING A SEPARATE COMPONENT ALLOWS MORE PRECISE WAVEFORM CALCULATIONS |
| LATCH 124 | | $Q(T)=D(T-1)$ IF $C(T-1) == 1$ ELSE $Q(T-1)$ | SAMPLES WHEN THE CLOCK IS HIGH. THERE IS A UNIT DELAY FROM ANY CHANGE ON AN INPUT TO A CHANGE ON THE OUTPUT |
| FLIP-FLOP 128 | | $Q(T)=D(T-1)$ IF $C(T-1)==1$ AND $C(T-2)==0$ ELSE $Q(T-1)$ | SAMPLES WHEN THE CLOCK TRANSITIONS HIGH. THERE IS A UNIT DELAY FROM ANY CHANGE ON AN INPUT TO A CHANGE ON THE OUTPUT |
| UNIT DELAY BLOCK | | $Y(T)=A(T-1)$ | REPRESENTS A SHORT (UNIT) DELAY. MAY BE USED TO CREATE A PULSED (CHOPPED) CLOCK FROM A NON-PULSED CLOCK |
| PATH DELAY BLOCK 132 | | $Y(T)=A(T-N)$, $0<= N <=P$; WHERE P IS AN UPPER BOUND | REPRESENTS A COMBINATIONAL PATH DELAY, WHICH IS TYPICALLY NOT KNOWN IN AN RTL MODEL, BUT IS ASSUMED TO HAVE SOME UPPER BOUND DETERMINED BY STATIC TIMING ANALYSIS. SOME EMBODIMENTS CAN INSERT THIS COMPONENT INTO THE RTL TO MODEL SUCH DELAYS. |
| PRIMARY INPUT | | $Y(T) = UNKOWN$ | REPRESENTS AN INPUT TO THE CIRCUIT BEING CHECKED |
| PRIMARY OUTPUT | | | REPRESENTS AN OUTPUT OF THE CIRCUIT BEING CHECKED |
| CLOCK GENERATOR 436 | | Y OSCILLATES PERIODICALLY BETWEEN 0 AND 1 | REPRESENTS A CLOCK SOURCE WITHIN THE MODEL. ALTERNATIVELY, CLOCKS CAN BE SOURCED BY PRIMARY INPUTS |

FIG. 1

UNSPECIFIED CROSSINGS CHECK

600

```
604  1  procedure find_all_unspecified_crossings:
      2    for each sequential element (latch or flip-flop) in the design {
      3      for each condition in the clocking conditions of the sequential element as defined above
      4        Let receive_vc = receive virtual clock corresponding to condition.
      5        Let input_net = net attached to data input pin.
      6        if ( phase expression of input_net is function of a virtual clock asynchronous
      7             to receive_vc under condition, and
      8             traverse_for_unspecified_crossing (input_net, receive_vc, condition) returns true )
      9        {
     10          Report unspecified crossing error for the given sequential element.
     11          The sequence of nets in the path will have been printed by
     12          traverse_for_unspecified_crossing.
     13        }
     14      } // end for each condition
     15    } // end for each sequential element
```

```
608  1  procedure traverse_for_unspecified_crossing
      2    formal arguments: net, receive_vc, condition
      3    return type: boolean (true iff net is part of an unspecified crossing)
      4  {
      5    if ( net has timing_type attribute with one of the six values in the table ) {
      6      // the asynchronous crossing is specified
      7      Return false.
      8    }
      9    else if ( net is sequential element output net, design input, or phase-overridden
         net ) {
     10      Print net as being the transmit element of an unspecified path.
     11      Return true.
     12    }
     13    else { // source must be a logic component (e.g., buffer, inverter, AND, XOR)
     14      for each input of component sourcing net {
     15        Let input_net = net attached to component input.
     16        if ( phase expression of input_net is function of a virtual clock asynchronous
     17             to receive_vc under condition )
     18        {
     19          if ( recursive call to traverse_for_unspecified_crossing (input_net,
         receive_vc,
     20             condition) returns true ) {
     21            Print net as being part of an unspecified path.
     22            Return true.
     23          }
     24        }
     25      } // end for
     26      Return false.
     27    }
     28  } // end procedure
```

SYNCHRONIZED CROSSING RULE AND STATIC CHECK

804
```
1  procedure find_all_unsynchronized_crossing_errors:
2  for each sequential element (latch or flip-flop) in the design {
3    for each condition in the clocking conditions of the sequential element as defined above {
4      Let receive_vc = sink virtual clock corresponding to condition.
5      Let input_net  = net attached to data input pin.
6      Let output_net = net attached to data output pin.
7      if ( phase expression of input_net is function of a virtual clock asynchronous
8           to receive_vc under condition, and
9           traverse_for_control_crossing (input_net, receive_vc, condition) returns true, and
10          traverse_synchronizer (output_net, receive_vc, condition, N-1) returns false )
11     {
12       Report unsynchronized crossing error for the given sequential element.
13     }
14   } // end for each condition
15 } // end for each sequential element
```

808
```
1  procedure traverse_for_control_crossing
2    formal arguments: net, receive_vc, condition
3    return type: boolean (true iff net is part of an asynchronous control crossing)
4  {
5    if ( net has timing_type attribute with value of async_point2point or async_glitchless ) {
6      // this is an asynchronous control crossing
7      Return true.
8    }
9    else if ( net is sequential element output net, design input, or phase-overridden net ) {
10     Return false.
11   }
12   else { // source must be a logic component (e.g., buffer, inverter, AND, XOR)
13     for each input of component sourcing net {
14       Let input_net = net attached to component input.
15       if ( phase expression of input_net is function of a virtual clock asynchronous
16            to receive_vc under condition )
17       {
18         // Recursive call:
19         if ( traverse_for_control_crossing (input_net, receive_vc, condition) returns true )
         {
20           Return true.
21         }
22       }
23     } // end for
24     Return false.
25   }
26 } // end procedure
```

812
```
1  procedure traverse_synchronizer
2    formal arguments: net, receive_vc, condition, num_stages_left
3    return type: boolean (true if net is part of a synchronizer)
4  {
5    if ( net has multiple sinks ) {
6      Return false.
7    }
8    else if ( net is sinked by a flip-flop data input ) {
9      if ( flip-flop's clock input's phase expression references receive_vc under condition ) {
10       if ( num_stages_left equals 1 ) {
11         Return true.
12       }
13       else {
14         Let output_net = net attached to flip-flop data output.
15         Recursively call traverse_synchronizer (output_net, receive_vc, condition,
16           num_stages_left - 1) and return the result.
17       }
18     }
19     else {
20       Return false.
21     }
22   }
23   else { // sink must be a logic component (e.g., buffer, inverter, AND, XOR)
24     if ( gate has multiple inputs, and the other inputs have phase expressions
25          other than "0", "1", or "?" )
26     {
27       Return false.
28     }
29     else {
30       Let output_net = net attached to logic component output.
31       Recursively call traverse_synchronizer ( output_net, receive_vc, condition,
32         num_stages_left ) and return the result.
33     }
34   }
35 } // end procedure
```

FIG. 8

CHECKING ALGORITHMS

900

FANOUT RULE AND STATIC CHECK

904

```
1   procedure find_all_fanout_in_crossing_errors:
2   for each sequential element (latch or flip-flop) in the design {
3     for each condition in the clocking conditions of the sequential element as defined above
4       Let sink_id    = unique identifier of given sequential element.
5       Let receive_vc = sink virtual clock corresponding to condition.
6       Let input_net  = net attached to data input pin.
7       if ( phase expression of input_net is function of a virtual clock asynchronous
8            to receive_vc under condition )
9       {
10        Let has_fanout = true iff input_net has multiple sinks.
11        Call traverse_for_spec_with_fanout (input_net, receive_vc, condition, has_fanout, sink_id);
12      }
13    } // end for each condition
14  } // end for each sequential element
```

908

```
1   procedure traverse_for_spec_with_fanout
2     formal arguments: net, receive_vc, condition, has_fanout (Boolean), sink_id
3     return type: null
4   {
5     if ( net has multiple sinks ) {
6       Set has_fanout = true.
7     }
8     if ( has_fanout and net has timing_type attribute with value of async_point2point
9          or async_glitchless )
10    {
11      Let spec_net = net.
12      if ( spec_to_sink_map contains key equal to (spec_net, receive_vc) ) {
13        Let (prev_sink_id, was_reported) = spec_to_sink_map [ spec_net, receive_vc ].
14        if ( was_reported is false ) {
15          Report fanout in crossing error for receive element prev_sink_id, due to fanout
16            occurring downstream of spec_net and feeding both prev_sink_id and sink_id.
17          Assign spec_to_sink_map [ spec_net, receive_vc ] equal to (prev_sink_id, true).
18        }
19        Report fanout in crossing error for sink_id, due to fanout occurring downstream
20          of spec_net and feeding both sink_id and prev_sink_id.
21      }
22      else {
23        Assign spec_to_sink_map [ spec_net, receive_vc ] equal to (sink_id, false).
24      }
25    }
26    if ( net is not sequential element output net, design input, nor phase-overridden net ) {
27      // source must be a logic component (e.g., buffer, inverter, AND, XOR)
28      for each input of component sourcing net {
29        Let input_net = net attached to component input.
30        if ( phase expression of input_net is function of a virtual clock asynchronous
31             to receive_vc under condition )
32        {
33          Recursively call traverse_for_spec_with_fanout (input_net, receive_vc, condition,
34            has_fanout, sink_id).
35        }
36      } // end for
37    }
38    Return.
39  } // end procedure
```

FIG. 9

CHECKING ALGORITHMS

COMBINATIONAL CROSSING ERROR

1000

1004
```
1   procedure find_all_combinational_crossing_errors:
2     for each sequential element (latch or flip-flop) in the design {
3       for each condition in the clocking conditions of the sequential element as defined above
4         let receive_vc = sink virtual clock corresponding to condition
5         let input_net  = net attached to data input pin
6         if ( is_glitch_prone ( phase expression of input_net, receive_vc, condition ) and
7              traverse_for_point2point_crossing (input_net, receive_vc, condition) returns true )
8         {
9           Report combinational crossing error for the given sequential element.
10        }
11      } // end for each condition
12    } // end for each sequential element
```

1008
```
1   procedure traverse_for_point2point_crossing
2     formal arguments: net, receive_vc, condition
3     return type: boolean (true iff net is part of an async_point2point crossing)
4   {
5     if ( net has timing_type attribute with value of async_point2point ) {
6       Return true.
7     }
8     else if ( net is sequential element output net, design input, or phase-overridden net ) {
9       Return false.
10    }
11    else { // source must be a logic component (e.g., buffer, inverter, AND, XOR)
12      for each input of component sourcing net {
13        let input_net = net attached to component input
14        if ( phase expression of input_net is function of a virtual clock asynchronous
15             to receive_vc under condition )
16        {
17          if ( recursive call to traverse_for_point2point_crossing (input_net, receive_vc,
18               condition) returns true )
19          {
20            Return true.
21          }
22        }
23      } // end for
24      Return false.
25    }
26  } // end procedure
```

FIG. 10

METHODS FOR STATIC CHECKING OF ASYNCHRONOUS CLOCK DOMAIN CROSSINGS

RELATED APPLICATIONS

This application is a continuation of, and claims the priority benefit of U.S. patent application Ser. No. 14/560,599, filed on Dec. 4, 2014, entitled "STATIC CHECKING OF ASYNCHRONOUS CLOCK DOMAIN CROSSINGS," which claims the priority benefit of U.S. Provisional Application Ser. No. 61/912,345 filed Dec. 5, 2013, entitled "DETECTION OF CLOCK DOMAIN CROSSINGS AND POTENTIAL DEFECTS IN A CIRCUIT DESIGN AT THE REGISTER TRANSFER LEVEL," each of which are incorporated herein by reference. This application is also related to U.S. patent application Ser. No. 14/547,953, filed on Nov. 19, 2014, entitled "CONDITIONAL PHASE ALGEBRA FOR CLOCK ANALYSIS," which is incorporated herein by reference.

BACKGROUND

Embodiments of the inventive subject matter generally relate to the field of circuit design, and, more particularly, to electronic design automation (EDA) tools to perform static checking of asynchronous clock domain crossings in a register transfer level (RTL) design of a chip or a system on a chip.

EDA tools are used to evaluate chip designs prior to fabrication. The EDA process broadly consists of two steps. The first step is a check of the RTL design logic. The second step is a creation of a physical circuit design from the RTL design. The first step, checking the design logic, can be referred to as RTL design checking. In RTL design checking, a language such as VHDL (Very High Speed Integrated Circuit Hardware Description Language) or Verilog can be used to describe and model the logical behavior of a circuit. RTL design checking itself can be decomposed into two steps: static checking, in which the structure of the design is analyzed without simulating its behavior; and dynamic checking, also referred to as verification, in which the behavior of the design is simulated or analyzed using formal verification techniques.

Asynchronous clock domain crossings (CDCs) are notorious for causing bugs and escapes in hardware designs, due to their difficulty in verifying pre-silicon. They are generally difficult to verify because their behavior is fundamentally nondeterministic and affected by physical delays, clock phase relationships, and possibly synthesis optimizations—things which are typically not modeled accurately in functional simulation environments.

Due to these problems, specialized tools have been developed, to analyze RTL designs, identify asynchronous crossings, characterize them, and sometimes graphically illustrate them. This allows a designer to review the crossings in a design, to determine if they are intentional or not. These tools will often attempt to verify the correctness of crossings as well. For example, a tool may perform static checks, which are checks that can be performed by the tool itself by merely analyzing the structure of the design.

Generally, however, conventional tools require manual intervention, to review and approve or disapprove of reported crossings, and filter out false failures. This is because current approaches typically attempt to infer the properties to be checked from commonly accepted "rules of thumb", or by attempting to recognize "design patterns" within the design to determine designer intent. However, in real designs there are often legitimate exceptions made to these common rules or patterns.

Meanwhile, the number of asynchronous crossings has continued to grow on modern processor and system-on-chip (SoC) designs. For example, modern designs can have over 100,000 individual asynchronous crossing endpoints. This makes any approach that requires manual intervention more expensive and more likely to impact project schedules.

SUMMARY

A circuit design checker receives a circuit design. The circuit design can include a first set of one or more logic components in a first clock domain and a second set of one or more logic components in a second clock domain. The circuit design checker identifies a first subset of the second set of one or more logic components that receive one or more asynchronous clock domain crossings. The circuit design is traversed to determine whether a subset of the one or more asynchronous clock domain crossings does not pass through a signal having an attribute indicating that the signal is intended to be part of the one or more asynchronous clock domain crossings. If such a crossing exists, an error is indicated for the circuit design.

BRIEF DESCRIPTION OF THE DRAWINGS

The present embodiments may be better understood by referencing the accompanying drawings.

FIG. 1 illustrates a table of example circuit components that can be employed to model a circuit design.

FIG. 6 illustrates example algorithms to detect unspecified clock domain crossings in a design.

FIG. 8 illustrates algorithms to identify asynchronous control crossings that are not synchronized by an N-stage synchronizer.

FIG. 9 illustrates example checking algorithms to identify particular types of fanouts in asynchronous crossings.

FIG. 10 illustrates example algorithms 1000 to find combinational crossing errors in a design.

DESCRIPTION OF EMBODIMENT(S)

Figure 2:
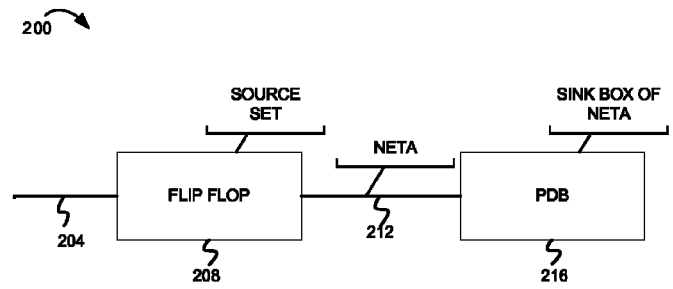
FIG. 2 is an example circuit diagram that illustrates terminology used in example algorithms adapted to implement static checking of asynchronous clock domains described in subsequent figures.

The description that follows includes example systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

Chips and systems on chips continue to increase in complexity, comprising many systems and sub-systems. These systems and sub-systems might comprise multiple clock domains. A clock domain is a set of sequential logic elements, such as transparent latches and flip-flops, and combinational logic associated with these sequential logic elements that are clocked by a common clock or by clocks having common frequency and a fixed phase relationship. A clock signal causes a change in the state of sequential logic, such as a flip-flop or transparent latch. A clock domain crossing is a path from a sequential logic element or other source of state transitions in a design in a first clock domain to a sequential element in a second clock domain. The clock in the first domain may operate asynchronously with respect to the second clock domain. Two clock domains are operating asynchronously with respect to one another if their respective clock signals do not have a fixed phase and frequency relationship with each other, and neither domain is in a hold state. In such cases, when a data signal path crosses from the first clock domain to the second clock domain, the crossing is referred to as an asynchronous clock domain crossing.

Asynchronous clock domain crossings can be sources of errors in chip operation. For example, errors can be produced at asynchronous clock domain crossings due to glitches and metastability. In general, a glitch occurs due to delays in inputs to a circuit component, in the delay inherent in a circuit component changing its output to reflect changes to its input, or both. For example, consider a first input and a second input to an AND gate. Assume that the first input at time t=1 is expected to transition to a 1 and the second input at time t=1 is expected to transition to a 0. However, if the second input is delayed, such that at time t=1, the second input is a 1 rather than a 0, then the output of the AND gate will be a 1 rather than the anticipated 0. Metastability occurs when a signal exists in an indeterminate state between a 0 and 1. This indeterminateness eventually is typically resolved over a period of time such that the probability of a signal remaining in an indeterminate state falls exponentially as a function of time.

FIG. 1 illustrates a table 100 of example circuit components that can be employed to model a circuit design. Column 108 is a symbol that is commonly used to represent the corresponding circuit component identified in column 104. Column 112 describes the relationship between inputs to the circuit component identified in column 104 and the output that the circuit component generates based on the inputs furnished to the circuit component. The transparent latch 124 is an example circuit component in table 100. Column 112 specifies the relationship between the inputs to the transparent latch 124 and the output that the transparent latch 124 generates. The transparent latch 124 takes two inputs: a data signal, represented by D, and a clock signal, represented by C. The clock signal can be generated by a clock generator 136 or other harmonic oscillator. The transparent latch 124 samples the data signal D when the clock signal equals 1. Thus, the output Q of the transparent latch 124 at time t, denoted Q(t), equals the data value D at time t−1, denoted D(t−1), when the clock at time t−1 takes a value of 1, denoted C(t−1)=1. Otherwise, the output Q of the transparent latch 124 does not change. In another embodiment, the transparent latch 124 samples the data signal D when the clock signal assumes a value of 0 rather than a value of 1.

The flip-flop 128 is another circuit component in table 100. Like the transparent latch 124, the flip-flop 128 receives two inputs, a data signal D and a clock signal C. The output Q of the flip-flop 128 equals the value of the data signal. The flip-flop 128 samples the data signal during a small interval of time when the clock signal transitions from a 0 to a 1, unlike the transparent latch 124, which continuously samples the data signal when the clock signal equals a 1. Thus, if the data signal has a value of 0 at the time at which the clock transitions from a 0 to a 1, then the output of the flip-flop 128 will become a 0. Otherwise, if the data signal has a value of 1 at the time at which the clock transitions from a 0 to a 1, then the output of the flip-flop 128 will become a 1. Column 112 specifies this relationship. The output of the flip-flop 128 Q(t) at time t equals the value of the data signal at time t−1, denoted D(t−1), if the clock signal at time t−1 denoted C(t−1)=1, and the clock signal at time t−2, denoted C(t−2)=0, thereby signifying a transition in the clock signal from a 0 to a 1. The flip-flop 128 can be modeled by two transparent latches 124. In some embodiments, the transparent latch 124 and flip-flop 128 each are modeled to include a unit delay such that the transparent latch 124 and flip-flop 128 express the output shown in column 112 after a unit has elapsed from the time of receipt of an input that causes a change in state of the output. In some embodiments, the combinational logic components of table 100 shown in FIG. 1, such as the AND gate 120, are modeled to have no delay between the time that the component receives an input and the time that the component generates an output based on the received input. However, any real combinational logic circuit component will typically exhibit a delay between receiving an input and generating an output. To model such a delay, some embodiments employ a path delay block (PDB) 132 to represent a non-deterministic, bounded delay on the time that elapses for a combinational circuit component to generate an output based on received inputs. The foregoing timing assumptions associated with the circuit components in table 100 can obviate any need to model physical time; hence, some embodiments permit modeling abstract time thereby conserving computational resources.

FIG. 2 is an example circuit diagram 200 that illustrates terminology used in example algorithms adapted to implement static checking of asynchronous clock domains described in subsequent figures. The flip-flop 208 and path delay block 216 are referred to as boxes. The boxes 208, 216 also are referred to as nodes. The connectors 204, 212 are referred to as nets. The connector 204 is the input net to box 208, and the connector 212 is the output net to the box 208. Box 216 is the sink box of netA 212.

Figure 3:
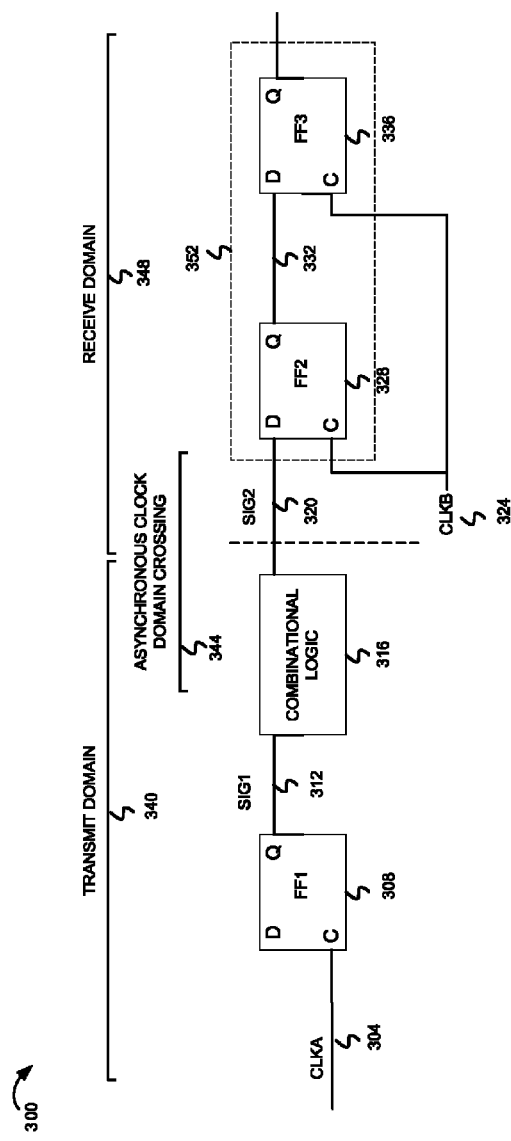
FIG. 3 is an example circuit diagram 300 that further illustrates terminology used in example algorithms.

FIG. 3 is an example circuit diagram 300 that further illustrates terminology used in example algorithms. Flip-flop 308 is referred to as a transmit element, because it is the source of a signal at the transmit portion 340 of the asynchronous clock domain crossing 344. CLKA 304 is referred to as the transmit clock, since CLKA 304 governs state changes associated with the flip-flop 308. The transmit clock, the transmit element, and the combinational logic 316 each belong to the transmit domain 340. The signal SIG1 312, which is the first signal originating in the transmit domain 340 that can induce state transitions, is referred to as a transmit data signal.

The flip-flop 328 is a receive element, because it is a sequential logic element at the receiving end of the asynchronous clock domain crossing 344. Flip-flop 336 can be referred to a stage two element. The flip-flop 328 may also be referred to as a stage one element, because it is the first flip-flop in the receive domain reached by the path from the transmit domain 340. If the design 300 included subsequent flip-flops after flip-flop 336, such flip-flops could be referred to as stage 3, 4, and N elements respectively. CLKB 324 is referred to as the receive clock, since the receive element is clocked by CLKB 324. The elements 324, 328, and 336 are in the receive domain 348. SIG2 320 is referred to as the receive data signal, since the receive element 328 samples the receive data signal 320. In other words, a receive data signal is the signal that the receive element samples when its clock input is active or (if edge-triggered) has an active edge. Flip-flops 328 and 336 constitute a synchronizer 352.

The techniques described herein can be adapted to check the handling of metastability in a design. A signal is metastable if it fluctuates in an indeterminate state between a logic 0 and a logic 1. Eventually, such a signal settles to a determinate state, either a logic 0 or logic 1. Flip-flops 228 and 236 constitute a metastability path, which is a path from the receive element to a stage two element and possibly to additional stages, depending on the probability of metastability propagating through the path.

Table 1 below provides example timing type attribute values that can be implemented, in one embodiment, to check aspects of a design associated with asynchronous clock domain crossings. A timing type attribute is a label that can be assigned to a net or node of a computer readable design to indicate some characteristic about a signal associated with a net or a component associated with a node. In one embodiment, the timing type attribute disclosed in U.S. Pat. No. 8,122,410 can be employed to implement aspects of embodiments associated with checking design parameters related to asynchronous clock domain crossings. The timing type attribute can be implemented as an enumerated class that contains multiple attribute values. When the timing type attribute is applied to a net or node, one of the values in the timing type class can be selected. The six example timing type attribute values provided in Table 1 are apropos to the present disclosure. The timing type value column provides a label for a timing type attribute used in some embodiments. The description column provides a description of a use for the corresponding timing type value.

TABLE 1

Timing Type Attributes

| Timing Type Value | Description |
| --- | --- |
| async_point2point | Specifies that the signal is part of an asynchronous control crossing that is inherently glitch-free because it originates from a single transmit element, and passes through no combinational logic. This also specifies that there is exactly one receive element downstream of the signal, which is the data input pin of a sequential element (latch or flip-flop). |
| async_glitchless | Specifies that the signal is part of an asynchronous control crossing but may be generated by a glitch-free combinational function over multiple transmit elements. This also specifies that there is exactly one receive element downstream of the signal, which is the data input pin of a sequential element (latch or flip-flop). |
| async_reset | Specifies that the signal is part of an asynchronous control crossing that may be generated by a glitch-free combinational function over multiple transmit elements, and that feeds an asynchronous reset input of one or more sequential elements (or can otherwise force a sequential element into a reset state). |

TABLE 1-continued

Timing Type Attributes

| Timing Type Value | Description |
| --- | --- |
| async_gated | Specifies that the signal is part of an asynchronous data crossing through which asynchronous transitions are gated (blocked) from being transmitted to receive latches. For example, there is a multiplexer or AND-gate that gates the crossing until the data is stable, so that the receive latch should never sample an asynchronous transition. |
| async_qualified | Specifies that the signal is part of an asynchronous data crossing that is not protected from metastability; therefore, the outputs of receive latches must be ignored until metastability has subsided, as qualified by a separate control mechanism. |
| async_other | Specifies an asynchronous crossing that does not fall into one of the preceding categories. |

Figure 4:
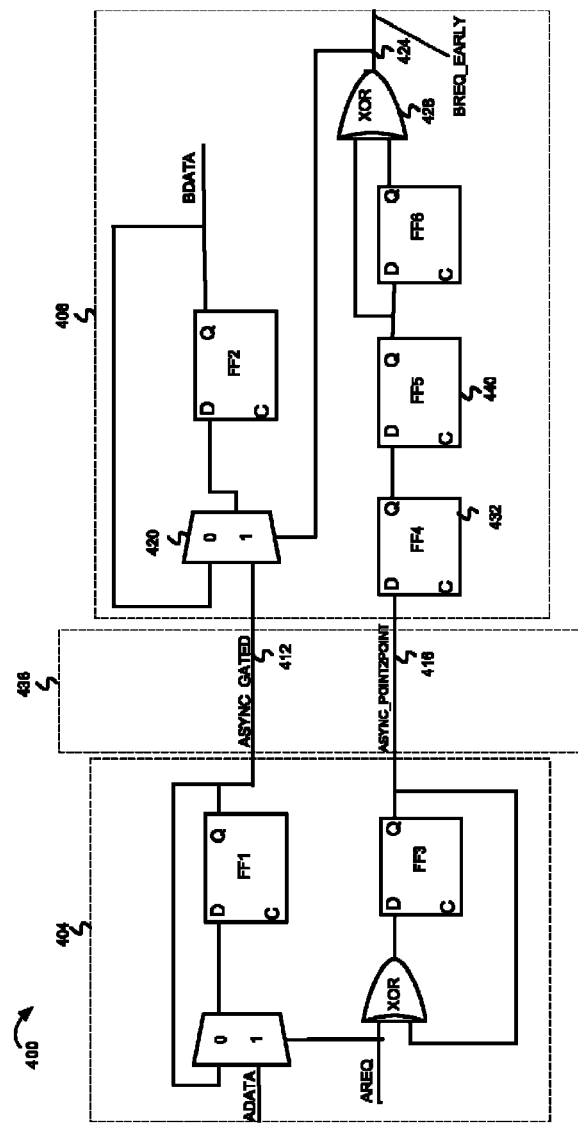
FIG. 4 illustrates a circuit design with an asynchronous data crossing and an asynchronous control crossing.

FIG. 4 illustrates a circuit design 400 with an asynchronous data crossing 412 and an asynchronous control crossing 416. The block 404 is a first clock domain wherein the circuit components are governed by a first clock signal, and the block 408 is a second clock domain wherein the circuit components are governed by a second clock signal that is asynchronous to the first clock signal. The circuit design 400 is intended to work as follows. When control signal areq is asserted (e.g., set to logic level 1) for one clock period of the first clock domain 404, the data present on signal adata will be transmitted to the second clock domain 408, where the breq_early signal will be asserted for one clock period in the second clock domain 408 to indicate the arrival of the data on the bdata signal on the following clock cycle.

The interface between a first clock domain and a second clock domain that operates asynchronously to the first clock domain is referred to as an asynchronous interface 436. An asynchronous interface is one or more asynchronous crossings that collectively implement a protocol to transmit information from one clock domain to another. Such an interface generally comprises one or more control crossings and optionally one or more data crossings. In the example illustrated in FIG. 4, asynchronous data crossing 412 and asynchronous control crossing 416 form asynchronous interface 436.

An asynchronous data crossing is an asynchronous crossing in which a signal is provided to logic that might not react immediately to transitions through the transmit path. For example, the crossing 412 is an asynchronous data crossing, because the signal 412 is transmitted from the first clock domain 404 to the second clock domain 408, and the signal 412 is received by a multiplexer 420 that might not react immediately to the received signal 412, because the multiplexer 420 samples the received signal 412 when it receives a selection signal 424 from the XOR gate 428.

The crossing 416 is an asynchronous control crossing, because the signal 416 crosses from the first clock domain 404 to the second clock domain 408, and the signal 416 is provided to logic, in this example a flip-flop 432, that may react immediately to transitions from the transmit domain. In particular, the flip-flop 432 is sensitive to changes from the transmit domain. Net 412 and net 416 can be assigned one of the timing types from Table 1 above in some embodiments. In the example illustrated in FIG. 4, the timing_type attribute async_gated value has been assigned to net 412, and the timing_type attribute async_point2point has been assigned to net 416.

Use of Phase Algebra

Some embodiments can use a "conditional phase algebra" to classify nets of a circuit. Using conditional phase algebra, the nets of a circuit can be classified by the set of waveforms that can occur on those nets, denoting such sets by strings called phase expressions. This classification distinguishes the type of signal (e.g., clock vs. data vs. constant), clock domain, clock phase (e.g., leading vs. trailing), and other characteristics, such as mode dependencies. In addition, conditional phase algebra includes means to identify the receive elements of asynchronous clock domain crossings by comparing the phase expressions on sequential element data input signals with those on corresponding clock input signals, and detecting when such phase expressions refer to asynchronous clock domains.

A clock domain can be associated with a virtual clock, which is an abstract source of transitions in the circuit. It may represent an oscillator within the circuit itself, or an oscillator outside the circuit, which causes transitions appearing at circuit inputs. The term "clock domain" can be used synonymously with "virtual clock." As used herein, "P domain" refers to latches and logic clocked by virtual clock P. As used herein, a primary virtual clock is a virtual clock that is independent of all other primary virtual clocks; and a secondary virtual clock is a virtual clock that is a function of one or more other virtual clocks (primary or secondary). If two clock domains are operating asynchronously with respect to each other, as defined above, this implies that the corresponding virtual clocks are either two distinct primary clocks, or they are secondary clocks that are functions of distinct primary clocks in some mode.

In some embodiments, a designer may assign phase expressions to primary inputs, to classify the transitions arriving on those inputs in terms of one or more virtual clocks. This would then include those inputs into the clock domains for those virtual clocks. A designer may also assign phase expressions to certain internal nets that would not otherwise be so classified. This could be used, for example, to assign a clock domain to the output of a "black box", or portion of the design that is not analyzed. For example, a black box may be used for an analog circuit, such as a phase-locked-loop (PLL), that is embedded within an otherwise digital circuit. As used herein, the term phase-overridden net means an internal net that belongs to a given clock domain solely because of such a phase expression assignment by the designer (as opposed to having a phase expression propagated from upstream nets).

A transmit element, as defined above, is a sequential element output net, or a primary input net, or a phase-overridden net, having a phase expression referring to the virtual clock corresponding to the transmit domain, which will be referred to as the transmit virtual clock. A receive element is generally the data input net of a sequential element whose clock input net has a phase expression referring to the virtual clock corresponding to the receive domain, which will be referred to as the receive virtual clock. If the circuit model is expanded to include sequential elements that have asynchronous reset inputs (i.e., an input signal that, when asserted, forces the sequential element into a reset state independent of the clock input), then such an input can be considered to be a receive element if its phase expression refers to the transmit virtual clock.

The methods described in detail below with reference to FIGS. 5-10 use techniques to determine the virtual clocks and conditions (modes) associated with sequential elements. In addition, the methods described in detail below use the term "clocking conditions" to informally refer to the different modes under which a sequential element is clocked; and to more specifically mean the following:

Let pair (C, D) be the phase expressions for the clock and data inputs, respectively, of a sequential element (latch or flip-flop); each of (C, D) being written in "ROLCMP form."

Let pair (C1, D1) be the "coarsest common refinement of (C, D)".

Let clocking conditions be the list of mode expressions in C1 whose corresponding mode-independent phase expressions (MIPEs) contain exactly one clock-type phase tag. The virtual clock referenced by such a phase tag will be called the "receive virtual clock" for the sequential element under the corresponding condition (mode expression).

Further details on the conditional phase algebra used in some embodiments can be found in U.S. patent application Ser. No. 14/547,953, entitled "CONDITIONAL PHASE ALGEBRA FOR CLOCK ANALYSIS," and in U.S. Provisional Patent Application Ser. No. 61/912,345 entitled "DETECTION OF CLOCK DOMAIN CROSSINGS AND POTENTIAL DEFECTS IN A CIRCUIT DESIGN AT THE REGISTER TRANSFER LEVEL," both of which have been previously incorporated by reference.

The use of the conditional phase algebra is desirable, because in some embodiments, conditional phase algebra can be used to guide the circuit netlist traversals disclosed below, thus avoiding unnecessary and time-consuming netlist traversals. However, conditional phase algebra is not strictly required to implement the embodiments described herein. Those skilled in the art having the benefit of the disclosure could adapt or utilize other classification and identification techniques. For example, techniques used by static timing analysis for classifying the nets in a circuit and identifying receive elements can be used in some embodiments.

FIGS. 5-10 illustrate example checking algorithms to statically check for errors associated with asynchronous clock domain crossings in designs like those depicted in FIG. 4. The example checking algorithms shown in FIGS. 5-10 assume that phase ids or phase expressions have been propagated through each net of the computer readable design. Additionally, the example checking algorithms included in FIGS. 5-10 employ the attribute values listed in Table 1. In one embodiment, the algorithms illustrated in FIGS. 5-10 can be implemented after each clock domain crossing has been identified in a design. The algorithms in FIGS. 5-10 employ the concept of a clocking condition. Let C represent the phase expression for the clock input to a sequential logic component, and let D represent the phase expression for the data input to a sequential logic component. The variable pair (C,D) can be expressed in ROLCMP (reduced orthogonal list of condition-MIPE pairs) form. Let pair (C1, D1) represent the coarsest common refinement of variable pair (C,D). Then, clocking conditions are the list of mode expressions in C1, the corresponding MIPEs (mode-independent phase expressions) of which contain exactly one clock type phase tag. The virtual clock associated with the clock type phase tag is said to be the virtual clock corresponding to the clocking condition. Each clocking condition is a mode expression.

Figure 5:
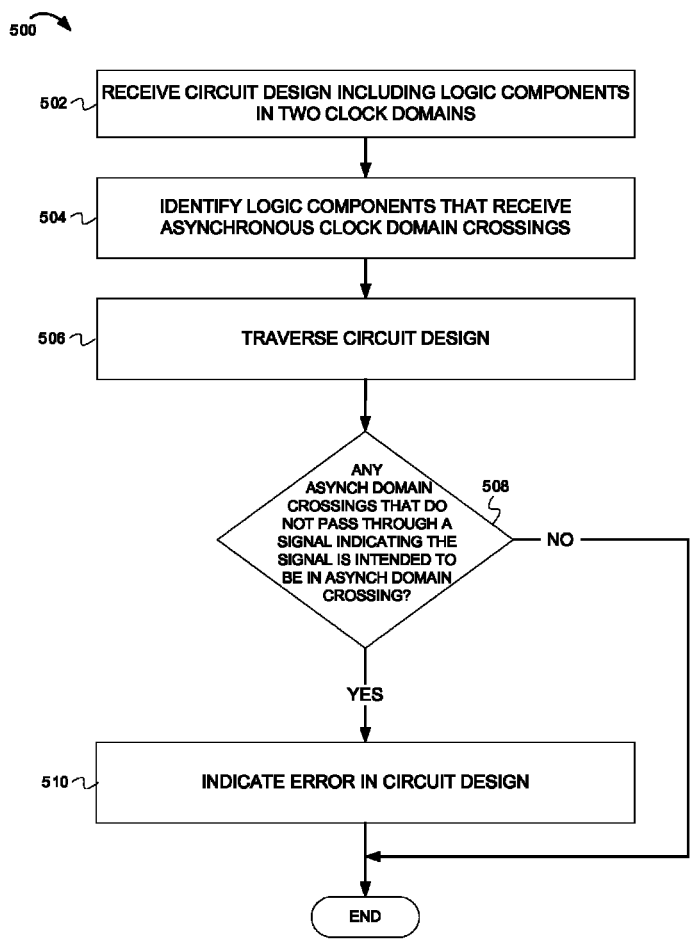
FIG. 5 is a flow chart illustrating a method for checking a circuit design for errors involving asynchronous clock domain crossings.

FIG. 5 is a flow chart 500 illustrating a method for checking a circuit design for errors involving asynchronous clock domain crossings according to embodiments. At block 502 a circuit design checker receives a circuit design. The circuit design can include a first set of one or more logic components in a first clock domain and a second set of one or more logic components in a second clock domain.

At block 504, the circuit design checker identifies a first subset of the second set of one or more logic components that receive one or more asynchronous clock domain crossings.

At block 506, the circuit design is traversed.

During the traversal, a check block 508 is made to determine whether a subset of the one or more asynchronous clock domain crossings does not pass through a signal having an attribute indicating that the signal is intended to be part of the one or more asynchronous clock domain crossings.

At block 510, an error is indicated for the circuit design if the check at block 508 determines that at least one asynchronous clock domain crossings does not pass through a signal having an attribute indicating that the signal is intended to be part of the one or more asynchronous clock domain crossings.

Further details on the method described above and additional methods performed by a circuit design checker are described below.

Specified Crossing Check

In some embodiments, a circuit design checker may implement a Specified Crossing Check. A circuit design checker implementing the Specified Crossing Check determines that an "unspecified crossing error" occurs when an asynchronous crossing is detected that does not pass through a signal in the RTL design that has been assigned a timing_type attribute (e.g., one of the six values given in Table 1 above).

One aspect of this check is to ensure that every asynchronous crossing is intended by the designer. It can catch, for example, a designer accidentally using the wrong clock signal to clock a sequential element.

A crossing that passes through a net having such an attribute is said to be "specified by the attribute". Note that a given crossing may pass through multiple such nets, and thus have multiple specifications.

An asynchronous clock domain crossing can be identified by traversing a circuit netlist, in any of a variety of manners, to find a path from a sequential element (or other source of transitions) in one clock domain, to a sequential element in a different, asynchronous clock domain. During such traversal, a flag or marker can be propagated, indicating the presence of the timing_type attribute or other specification on a net in the path. This can in turn be used to ensure that every asynchronous crossing path is so specified. In addition, some embodiments handle path reconvergences. A reconvergence can result in a path that is correctly specified, but is also part of a path that is not so specified. In such cases, the path is reported as an unspecified crossing error.

FIG. 6 illustrates algorithms to find and report unspecified crossings in a circuit design. The algorithms described in FIG. 6 can be performed following the classification of a circuit netlist as described in U.S. patent application Ser. No. 14/547,953, entitled "CONDITIONAL PHASE ALGEBRA FOR CLOCK ANALYSIS," and in U.S. Provisional Patent Application Ser. No. 61/912,345 entitled "DETECTION OF CLOCK DOMAIN CROSSINGS AND POTENTIAL DEFECTS IN A CIRCUIT DESIGN AT THE REGISTER TRANSFER LEVEL," both of which have been previously incorporated by reference. In some embodiments, the algorithms described below in FIG. 6 are part of a depth-first backward traversal of the netlist. In this and subsequent procedures, the variable condition refers to a mode or mode expression (i.e., function over modes) under which an asynchronous crossing occurs, in accordance with the Conditional Phase Algebra. The variable receive_vc refers to the receive virtual clock.

FIG. 6 illustrates example algorithms 600 to detect unspecified clock domain crossings in a design. Algorithm 604 iterates through each sequential logic component, such as a transparent latch or flip-flop, in a design. Algorithm 604 iterates through each condition in the clocking conditions of each sequential element, storing the virtual clock corresponding to each condition in a variable denoted receive_vc and storing each net attached to a data input pin of each lath or flip-flop in a variable denoted input_net. The algorithm 604 then checks whether two criteria are satisfied. The first criterion is that the phase expression of the variable input_net is a function of a virtual clock asynchronous to the variable receive_vc under the condition being reviewed. The second criterion is that the function traverse_for_unspecified_crossing evaluates to true. Algorithm 608 implements the traverse_for_unspecified_crossing function. If both criteria are true then there is an unspecified crossing error corresponding to the tested component of sequential logic.

Algorithm 608 is an example algorithm that implements the traverse_for_unspecified_crossing function discussed in algorithm 604. In some embodiments, algorithm 608 is a recursive procedure that performs a depth-first backward traversal of the netlist. The traverse_for_unspecified_crossing returns true if a net is part of an unspecified crossing. Algorithm 608 checks whether a net has been assigned one of the six timing_type attributes listed in Table 1. If a net has been assigned one of the six timing_type attributes listed in Table 1, then it is a specified asynchronous crossing, and the traverse_for_uspecified crossing function returns a value of false. Otherwise, the traverse_for_unspecified crossing function checks whether a net is the output net of a sequential logic circuit component, a primary input, or a phase-overridden net. If a net falls within one of the three foregoing categories, then the net is the transmit data signal of an unspecified path, and the traverse_for_unspecified crossing function returns true. Otherwise, the algorithm 608 determines whether a source is a combinational logic component such as a buffer, inverter, AND, or XOR gate. If the source is a combinational logic component, then the algorithm 608 iterates through each input net of the combinational logic component, assigning the variable input_net to each net attached to the component input. The algorithm 608 checks whether the phase expression associated with the variable input_net is a function of a virtual clock asynchronous to the variable receive_vc, discussed in algorithm 604, under the given condition. If the foregoing is true, then the algorithm 608 recursively calls the traverse_for_unspecified_crossing function, checking to determine whether the function returns a value of true. If the function returns a value of true, then the input net associated with the combinational logic component is part of an unspecified path.

In some embodiments, the specified crossing check algorithms can be strengthened by requiring that only asynchronous clock domain crossings are specified by the timing_type attribute. I.e., any occurrence of the timing_type attribute on a signal that is not part of any asynchronous crossing in any mode would be reported as an "overspecified crossing" error. This would prevent the potential overuse of the attribute to forcibly prevent unspecified crossing errors.

Synchronized Crossing Check

In some embodiments, a circuit design checker may implement a Synchronized Crossing Check. A circuit design checker implementing the Synchronized Crossing Check determines that an "unsynchronized crossing error" occurs when a crossing specified as async_point2point or async_glitchless is not synchronized to control metastability.

An aspect of this check is to ensure that control crossings, which by definition feed logic that is sensitive to transitions from the transmit domain, are protected from metastability. This usually means, at a minimum, that there are two consecutive flip-flops (or latch pairs) in the receiving domain, before any logic or fanout.

Figure 7:
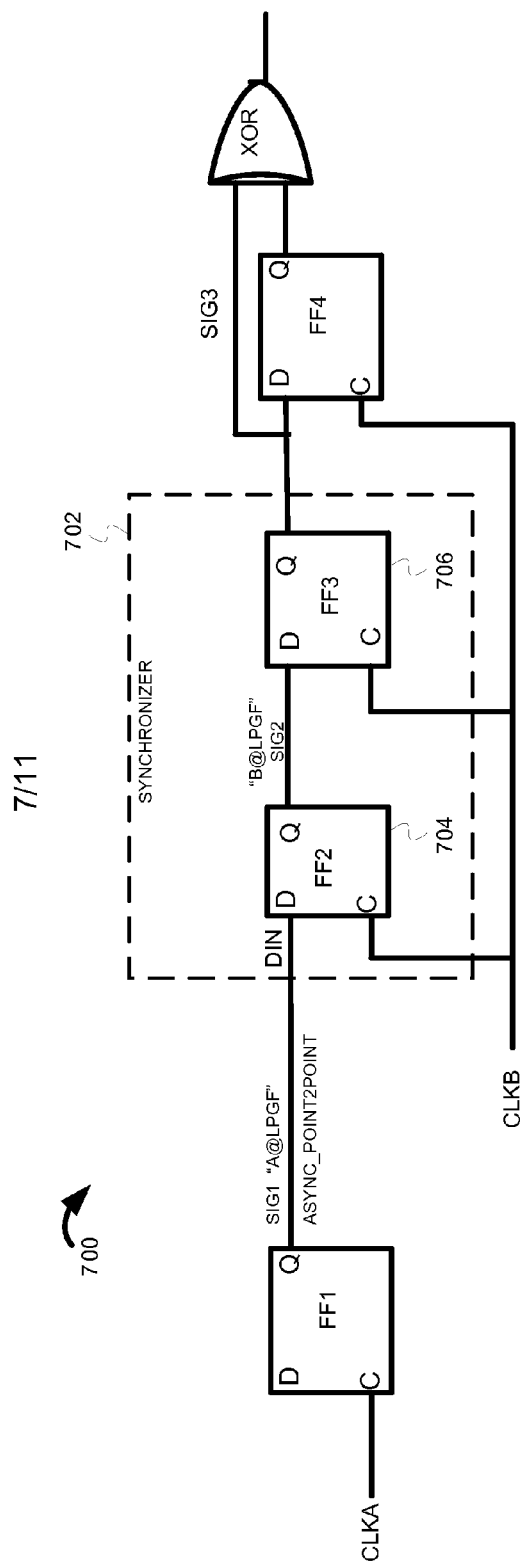
FIG. 7 illustrates an example circuit having a synchronizer in a receiving domain.

FIG. 7 illustrates an example circuit 700 having a synchronizer in a receiving domain. In this example, flip-flops FF2 and FF3 constitute a synchronizer. The purpose of the synchronizer is to produce an output (signal sig3) that has negligible probability of becoming metastable, which could cause downstream logic to malfunction.

Flip-Flop FF2 could, on any given edge of clkb, sample its input din at the same time that din is transitioning. Because din is asynchronous, it is not guaranteed to be stable during the setup/hold window of the receiving flip-flop, as would a synchronous signal. There is some (usually small) probability that if din is transitioning (between logic threshold voltages) at the same time that FF2 is sampling, FF2 will enter a metastable state, in which its output is in an indeterminate state, meaning that signal sig2 may be between logic threshold values or oscillating between threshold values. A metastable state will eventually "settle" into a logical low or high state, although it is generally not predictable which state it will settle in. The probability that a metastable signal remains metastable decreases exponentially over time, so that by the time of the following clock edge, the probability may be negligible. If so, then signal sig2 will have settled to a low or high state before flip-flop FF3 samples it, thus preventing FF3 from also going metastable.

The probability that the second flip-flop of a synchronizer (e.g., FF3) becomes metastable depends on the circuit technology (some flip-flops or latches are more likely to become metastable than others), the clock frequency (more time between clock edges allows more time for metastability from FF2 to settle), the propagation delay between the first and second flip-flop (the shorter the delay, the more time is left in the cycle for metastability to settle), and how frequently the asynchronous input (din) transitions. Integrated circuit designers will typically estimate this probability to determine what type of synchronizer is needed. For example, if the probability is deemed too high, a third flip-flop can be added to further isolate metastability from the downstream circuit; or a different flip-flop technology (e.g., "metastability-hardened") may be used. Sometimes a special nonprimitive component type (aka "module") having the desired characteristics is mandated for use as a synchronizer. Such a specialized component is exemplified by the dotted line 702.

FIG. 8 illustrates example algorithms 800 to identify asynchronous control crossings that are not synchronized by an N-stage synchronizer, where N is an arbitrary number that can be set by the designer. As noted above, a synchronizer is a series of two or more (N) flip-flops in the receive domain. For example, flip-flop 704 and flip-flop 706 constitute a synchronizer 702 (FIG. 7). The purpose of a synchronizer is to reduce the probability that the output signal from the synchronizer becomes metastable. A signal is metastable if it is in an indeterminate state between a logic 0 and a logic 1.

Algorithm 804 is an example algorithm that iterates through each sequential logic component of the design. For each condition or mode in the clocking conditions of the sequential logic component, the receive or sink virtual clock corresponding to a mode is stored in a variable designated receive_vc. The net attached to the data input pin of the corresponding sequential logic component is stored in a variable designated input_net. A third variable, designated output_net, is instantiated to store the net attached to the data output pin of the sequential logic component. The algorithm 804 checks conditions. The first is whether the phase expression associated with the variable input_net is a function of a virtual clock that is asynchronous to the variable receive_vc under the condition being iterated. The second is whether the function traverse_for_control crossing, implemented by example algorithm 808, returns a value of true. The third is whether the function traverse_synchronizer, implemented by example algorithm 812 returns a value of false. If the foregoing conditions are met, then there is an unsynchronized crossing error for the sequential logic component.

If a flip-flop is represented in the circuit model as latch-pairs, then some embodiments modify the algorithm to count two latch stages as one flip-flop stage (and check that each latch in a pair is clocked appropriately; e.g., with alternating phases of the clock). Some circuit models may have a distinct component type to represent a flip-flop. Another possibility is for a sequential element to be a pulse-clocked latch, which behaves like a flip-flop, and can be determined by the Conditional Phase Algebra.

The algorithm 808 is an example algorithm that determines whether a given receive element is the receive element of a control crossing, as specified by the timing_type attribute with a value of async_point2point or async_glitchless. In some embodiments, algorithm 808 is a recursive procedure that performs a depth-first backward traversal of the netlist. The algorithm 808 determines whether a net has a timing_type attribute of async_point2point or async_glitchless. If a net had been assigned either of the foregoing two timing_type attributes, then the net is part of an asynchronous control crossing. Otherwise, the algorithm 808 determines whether a net is a sequential element output net, a primary input net, or a phase-overridden net. If a net is any of the foregoing, the algorithm 808 returns a value of false. Otherwise, the algorithm 808 determines whether a source is a combinational logic component. If the component is a combinational logic component, then the algorithm 808 iterates through each input of the component, assigning the input net to a variable designated input_net. The algorithm 808 determines whether the phase expression associated with the input net is a function of a virtual clock that is asynchronous to the variable receive_vc under the given condition or mode. If the foregoing is true, then the algorithm 808 recursively calls itself.

Algorithm 812 is an example algorithm that determines whether a given receive element provides an input to N flip-flops that have no intervening combinational logic or fanout. Some embodiments consider a logic gate to be combinational logic only if it has multiple non-constant inputs, as can be determined by the phase algebra. Alternative embodiments may use stricter criteria, such as any multi-input logic gate. This can be done by algorithm 812, which in some embodiments is a recursive procedure that performs a depth-first forward traversal of the netlist.

Algorithm 812 first determines whether a net has multiple sinks. If a net has multiple sinks, then the algorithm 812 returns false, indicating the presence of fanout in the path. Otherwise, algorithm 812 determines whether a net is sinked by a flip-flop data input. If a net is sinked by a flip-flop data input, then the algorithm 812 determines whether the phase expression associated with the clock input of the flip-flop references the variable receive_vc under the given condition. If the foregoing is true, then the algorithm 812 determines the required number of stages in the design that remain, which was passed to the algorithm as an argument. If only one stage is required, then the algorithm 812 returns true. Otherwise, the algorithm 812 stores the output net associated with the flip-flop to a variable designated output_net. The algorithm 812 recursively calls itself, taking as input variables ouput_net, receive_vc, condition, and num_stages_left-1, returning the result of the call. If the phase expression associated with the clock input of the flip-flop does not reference the variable receive_vc under the given condition, algorithm 812 returns false. Otherwise, the algorithm 812 determines whether a sink is a combinational logic component such as a buffer, inverter, AND, or XOR gate. If a component is a combinational logic component, then the algorithm 812 determines whether the gate has multiple inputs and whether the other inputs have phase expressions other than "0," "1," or "?." If the foregoing is true, the algorithm 812 returns false, indicating the presence of combinational logic in the path. Otherwise, the algorithm 812 stores the net attached to the combinational logic component's output to a variable referred to as "output_net." The algorithm 812 recursively calls itself, returning the result.

Fanout Check

In some embodiments, a circuit design checker may implement a Fanout Check. A circuit design checker implementing the Fanout Check determines that an error occurs when a crossing specified as async_point2point or async_glitchless includes a fanout to multiple sinks in the sink domain downstream of the attributed signal.

An aspect of this check is to ensure that control crossings are synchronized before they fanout to multiple destinations in the receiving domain. Otherwise, if there is fanout to multiple synchronizers, any two synchronizers may sample a new value from the crossing on different cycles; or may resolve metastability to different values, thus producing conflicting states in the receiving domain, which the designer may not expect and which may not be properly modeled in simulation.

FIG. 9 illustrates example checking algorithms 900 to identify fanouts in asynchronous crossings that have been assigned an attribute of async_point2point or async_glitchless. Algorithm 904 calls algorithm 908 and the two algorithms 904 and 908 collectively implement the check described herein. In particular, algorithms 900 can be applied in conjunction with algorithms 800 to check whether control crossings fanout to multiple destinations in the receive domain. The algorithm 904 is an example algorithm that iterates through each transparent latch or flip-flop in a design. The algorithm 904 iterates through each condition in the clocking conditions of each transparent latch or flip-flop in a design. The algorithm 904 stores a unique identifier associated with the transparent latch or flip-flop in a variable designated sink_id. The algorithm 904 stores the sink virtual clock corresponding to the condition being iterated in a variable designated receive_vc. The algorithm 904 stores the net attached to the data input pin of the transparent latch or flip-flop in a variable designated input_net. The algorithm 904 checks whether the phase expression associated with the variable input_net is a function of a virtual clock asynchronous to the variable receive_vc under the condition. If the foregoing evaluates to true, then the algorithm 904 determines whether the variable input_net is associated with more than one sink. If the foregoing is true, then the algorithm 904 assigns the Boolean value true to the variable has_fanout. The algorithm 904 calls the algorithm 908.

Algorithm 908 is an example algorithm that implements the traverse_for_spec_with_fanout function. Algorithm 908 determines whether a net has multiple sinks. In some embodiments, algorithm 908 is a recursive procedure that performs a depth-first backward traversal of the netlist. If a net has multiple sinks, then algorithm 908 assigns the Boolean value true to the variable has_fanout. The algorithm 908 determines whether the variable has_fanout is true and whether the evaluated net has a timing_type attribute equal to async_point2point or async_glitchless. If both of the foregoing conditions are true, then the algorithm 908 stores the evaluated net in a variable referred to as spec_net. Algorithm 908 makes use of a data structure consisting of key/value pairs, also known as an associative array. The variable spec_to_sink_map denotes such an associative array, in which each key is a pair (spec_net, receive_vc) and each value is a pair (sink_id, was_reported). The spec_net is the name of a net assigned the timing_type attribute with value of async_point2point or async_glitchless. The receive_vc is the virtual clock of the receive domain. The sink_id is a unique identifier of the receive element. The was_reported is a Boolean value indicating whether an error has been reported for sink_id. The notation spec_to_sink_map [spec_net, receive_vc] refers to the value stored in spec_to_sink_map for key (spec_net, receive_vc). The value is itself a pair, (sink_id, was_reported). Algorithm 908 evaluates whether the variable spec_to_sink_map contains a key equal to the pair (spec_net, receive_vc). If the foregoing is true, then the algorithm 908 assigns the value stored in spec_to_sink_map for key (spec_net, receive_vc) in the variable pair (prev_sink_id, was_reported). Algorithm 908 determines whether the variable was_reported is false. If the variable was_reported evaluated to false, then the algorithm 908 reports a fanout in crossing error for the receive element identified by prev_sink_id due to a fanout occurring downstream of spec_net and feeding both the elements identified by prev_sink_id and sink_id. The algorithm 908 sets spec_to_sink_map [spec_net, receive_vc] equal to (prev_sink_id, true). Regardless of whether the variable was_reported evaluates to false, the algorithm 908 reports a fanout crossing error for sink_id due to a fanout occurring downstream of spec_net and feeding both sink_id and prev_sink_id. If the variable spec_to_sink_map does not contain a key equal to the pair (spec_net, receive_vc) then the algorithm 908 sets spec_to_sink_map [spec_net, receive_vc] equal to (sink_id, false). If a net is not the output net of a sequential logic element such as a transparent latch or flip-flop, nor a primary input or phase-overriden net, then the source is a combinational logic component. Algorithm 908 iterates through each input of the component. For each input of the component, algorithm 908 assigns the net attached to the component input to a variable input_net. Algorithm 908 determines whether the phase expression associated with the variable input_net is a function of a virtual clock asynchronous to the variable receive_vc under the given condition. If the foregoing evaluates to true, then algorithm 908 recursively calls itself.

It should be noted that there may be cases where fanout is acceptable; for example, a single asynchronous control signal may feed different units on a chip that are far apart and functionally independent. In some embodiments, the Fanout Check can be satisfied in such cases by the designer defining multiple secondary signals, one per destination, that are assigned equal to the first, and attributing each secondary signal instead of the first signal. This is the way a designer can specify that fanout is intentional and legitimate. A simulation model can then model the nondeterministic delays inherent in each crossing, to verify that the multiple destinations are indeed independent.

In an alternative embodiment, the Fanout Check could optionally be made stronger; e.g., by requiring no fanout to multiple receive elements from any domain (as opposed to limiting to just one sink domain). In a further alternative embodiment, the Fanout Check could be even stricter by a requirement of no fanout whatsoever downstream of the attributed signal (including synchronous sinks and design outputs).

Combinational Logic Check

In some embodiments, a circuit design checker may implement a Combinational Logic Check. A circuit design checker implementing the Combinational Logic Check determines that a "combinational crossing error" occurs when a crossing specified as async_point2point is not statically glitch-free. This implies that the crossing passes through no combinational logic that combines paths from multiple transmit elements, or that reconverges paths that may contain asynchronous transitions.

An aspect of this check is to ensure that control crossings, which by definition feed logic that is sensitive to transitions from the asynchronous domain, do not glitch. A glitch is a temporary deviation from the functional value of a signal. Glitches are generally forbidden in asynchronous control crossings because it is unpredictable when the receiving domain will sample the crossing; thus it is possible that any glitch could be sampled, causing the receiving side to receive an incorrect value.

In some embodiments, an optional stronger version of this check is to determine that no combinational logic combines synchronous transitions, since such logic is not generally required in asynchronous control crossings. The check can be optional because, assuming the synchronous path is properly timed, it should not allow a glitch that could be sampled by the receiving domain. A given design project may wish to make this mandatory.

FIG. 10 illustrates example algorithms 1000 to find combinational crossing errors in a design. A combinational crossing error exists at a net of a design that is required to be statically glitch free but is not. Statically glitch free means that the signal can be determined to be glitch free by a static check. Algorithm 1004 calls algorithm 1008. In particular, algorithm 1004 is an algorithm that iterates through each node representing a sequential logic component of a computer readable design. For each clocking condition associated with the sequential logic component, the algorithm assigns the virtual clock corresponding to the clocking condition to a variable denoted receive_vc. The algorithm assigns each net attached to the data input pin of the sequential logic component to a variable denoted input_net. The algorithm then checks two conditions, determined by the functions tranverse_for_point2_point_crossing and is_glitch_prone. The function is_glitch_prone takes three inputs. The function is_glitch_prone returns true if the evaluated net is glitch prone. In one embodiment, the function is_glitch_prone can be implemented to return true if and only if any one of the following three conditions is satisfied. The first condition is that the given phase expression is a function of a virtual clock that is asynchronous to receive_vc under the given condition, and the phase tag referencing such virtual clock has a phase type of C@L, C@LP, C@T, C@TP, or C@E. The second condition is that the given phase expression is a function of more than one virtual clock that is asynchronous to receive_vc under the given condition. The third condition is that the phase expression is a function of both a virtual clock that is asynchronous to receive_vc under the given condition, and a virtual clock that is the same or synchronous to receive_vc under the given condition. The function traverse_for_point2_point_crossing is implemented through the algorithm 1008, which is discussed below. If both the is_glitch_prone and traverse_for_point2_point_crossing return true, then the algorithm 1004 reports a combinational crossing error for the sequential logic component.

In some embodiments, algorithm 1004 takes advantage of the Conditional Phase Algebra to avoid traversing parts of the circuit for which no glitches are possible.

The algorithm 1008 is an example recursive algorithm that determines whether a net associated with a sequential logic component is part of an asynchronous crossing that is required to be statically glitch free. In some embodiments, algorithm 1008 is a recursive procedure that performs a depth-first backward traversal of the netlist. The algorithm 1008 determines whether a net has been assigned an async_point2point timing_type attribute. As indicated in Table 1, the async_point2point attribute specifies that a signal is part of an asynchronous control crossing that is inherently or statically glitch free. Accordingly, the algorithm 1008 returns a value of true if the algorithm finds an async_point2point timing_type attribute at a net. If the algorithm 1008 does not find such an attribute, the algorithm 1008 checks whether a net is an output net of a sequential logic component, whether a net is a primary input, or whether a net is a phase-overridden net, which is an internal net that has been assigned to a particular clock domain by a user, and is therefore considered the transmit data signal of an asynchronous clock domain crossing. If any of the foregoing conditions are true, then the algorithm 1008 returns a value of false to indicate that it has reached the transmit data signal of an asynchronous clock domain crossing without encountering an async_point2point timing_type attribute. Otherwise, the algorithm 1008 checks whether a net is associated with a node that is a combinational logic component, such as a buffer, inverter, AND, or XOR gate. The algorithm 1008 then iterates through each input_net associated with the component, checking whether the phase expression at the input_net is a function of a virtual clock that is asynchronous to the receive_vc variable. If the foregoing condition is true, then the algorithm 1008 calls itself. If the result of the foregoing is true, then the algorithm 1008 returns a value of true.

Asynchronous Reset Check

In some embodiments, a circuit design checker may implement an Asynchronous Reset Check. A circuit design checker implementing the Asynchronous Reset Check determines that an "asynchronous reset error" occurs when an asynchronous crossing to the asynchronous reset input of a sequential element (or that otherwise forces a sequential element into a reset state) does not pass through a net that has been attributed with a timing_type value of async_reset.

An aspect of this check is to ensure that asynchronous reset signals are intentional. This check could be extended to require that such crossings are either statically or dynamically glitch-free. The algorithm to detect this error is essentially identical to the algorithm to detect the unspecified crossing error; except that the backward traversals emanate from the reset inputs of sequential elements instead of data inputs; and the traversal looks for nets containing the timing_type attribute set specifically to async_reset as opposed to any of the given values.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 11:
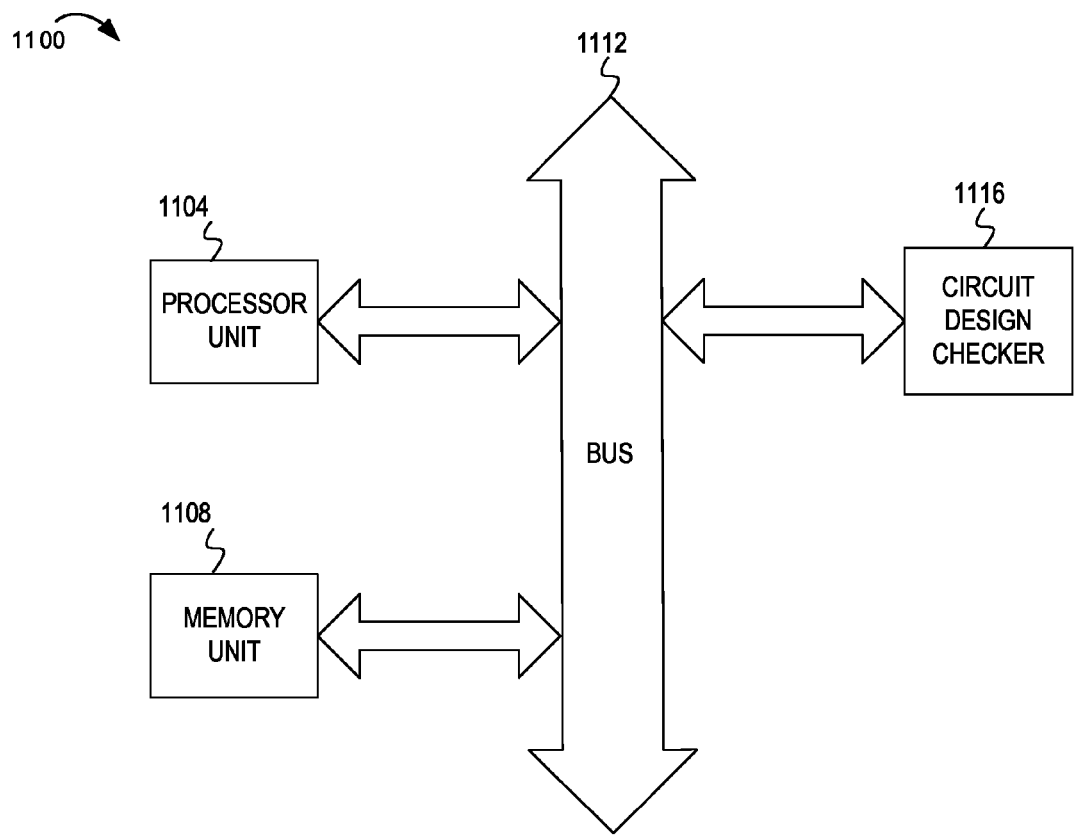
FIG. 11 is a system diagram of an example device that can implement shadow logic according to an embodiment of the disclosure.

FIG. 11 depicts an example computer system that can implement an embodiment of the disclosure. A computer system includes a processor unit 1104 (possibly including multiple processors, multiple cores, multiple nodes, and/or implementing multi-threading, etc.). The computer system includes memory 1108. The memory 1108 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 1112 (e.g., PCI, ISA, PCI-Express, HyperTransport®, InfiniBand®, NuBus, etc.), a network interface (e.g., an ATM interface, an Ethernet interface, a Frame Relay interface, SONET interface, wireless interface, etc.) (not depicted), and a storage device(s) (e.g., optical storage, magnetic storage, etc.) (not depicted). The system memory 1108 embodies functionality to implement embodiments described above. The system memory 1108 may include one or more functionalities that facilitate implementation of the shadow logic in a verification model. Any one of these functionalities may be partially (or entirely) implemented in hardware and/or on the processing unit 1104. For example, the functionality may be implemented with an application specific integrated circuit, in logic implemented in the processing unit 1104, in a co-processor on a peripheral device or card, etc. Further, realizations may include fewer or additional components not illustrated in FIG. 11 (e.g., video cards, audio cards, additional network interfaces, peripheral devices, etc.). The processor unit 1104, the storage device(s), and the network interface might be coupled to the bus 1112. Although illustrated as being coupled to the bus 1112, the memory 1108 may be coupled to the processor unit 1104. A static design checker 1116 also can implement the design checks in this systems and methods described above with reference to FIGS. 5-10. The static design checker unit 1116 can be implemented in any combination of software, hardware, or both.

While the embodiments are described with reference to various implementations and exploitations, it will be understood that these embodiments are illustrative and that the scope of the inventive subject matter is not limited to them. In general, techniques for modifying a verification model to identify glitches and model metastabiltiy as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for checking circuit designs with asynchronous clock domain crossings, the method comprising:

receiving a circuit design, the circuit design including a first set of one or more logic components in a first clock domain and a second set of one or more logic components in a second clock domain;

identifying, by one or more processors, a first subset of the second set of one or more logic components that receive one or more asynchronous clock domain crossings;

traversing, by the one or more processors, at least a portion of the circuit design to determine whether a subset of the one or more asynchronous clock domain crossings does not pass through a signal having an attribute indicating that the signal is intended to be part of the one or more asynchronous clock domain crossings; and indicating an error for the circuit design in response to determining that the subset of the one or more asynchronous clock domain crossings has at least one member.

2. The method of claim 1, further comprising:

indicating an error for the circuit design in response to determining that an asynchronous clock domain crossing has an attribute indicating that the asynchronous clock domain crossing is a control crossing and that the asynchronous clock domain crossing is not synchronized to control metastability.

3. The method of claim 2, wherein determining that the asynchronous clock domain crossing is not synchronized includes determining that the asynchronous clock domain crossing is not followed by at least two consecutive flip-flops or latch pairs in the second clock domain.

4. The method of claim 1, further comprising:

indicating an error for the circuit design in response to determining that an asynchronous clock domain crossing has an attribute indicating that the asynchronous clock domain crossing is a control crossing and that the asynchronous clock domain crossing includes a fanout to multiple sinks in the second clock domain.

5. The method of claim 1, further comprising:

indicating an error for the circuit design in response to determining that an asynchronous clock domain crossing has an attribute indicating that the asynchronous clock domain crossing is a point-to-point crossing and that the asynchronous clock domain crossing passes through combinational logic that combines paths from multiple transmit logic components.

6. The method of claim 1, further comprising:

indicating an error for the circuit design in response to determining that an asynchronous clock domain crossing has an attribute indicating that the asynchronous clock domain crossing is a point-to-point crossing and that the asynchronous clock domain crossing passes through combinational logic that reconverges paths that contain asynchronous transitions.

7. The method of claim 1, further comprising:

indicating an error for the circuit design in response to determining that an asynchronous clock domain crossing to an asynchronous reset input of a logic component does not pass through a signal having an attribute indicating that the signal is intended to be part of an asynchronous clock domain crossing to an asynchronous reset input of the logic component.

* * * * *